(12) United States Patent
Chen et al.

(10) Patent No.: US 11,306,404 B2
(45) Date of Patent: Apr. 19, 2022

(54) PRODUCTION SYSTEM FOR CHLORINE DIOXIDE SOLUTION

(71) Applicants: Cheng-Hong Chen, Kaohsiung (TW); Cheng-Yu Chen, Kaohsiung (TW)

(72) Inventors: Cheng-Hong Chen, Kaohsiung (TW); Cheng-Yu Chen, Kaohsiung (TW)

(*) Notice: Subject to any disclaimer, the term of this patent is extended or adjusted under 35 U.S.C. 154(b) by 30 days.

(21) Appl. No.: 16/952,093

(22) Filed: Nov. 19, 2020

(65) Prior Publication Data

US 2021/0087699 A1  Mar. 25, 2021

Related U.S. Application Data

(62) Division of application No. 16/239,539, filed on Jan. 4, 2019, now abandoned.

(51) Int. Cl.
| | |
|---|---|
| C25B 9/00 | (2021.01) |
| C25B 15/08 | (2006.01) |
| C25B 1/26 | (2006.01) |
| C25B 15/02 | (2021.01) |
| C01B 11/02 | (2006.01) |

(52) U.S. Cl.
CPC .......... C25B 15/08 (2013.01); C25B 1/26 (2013.01); C25B 15/02 (2013.01); C01B 11/022 (2013.01)

(58) Field of Classification Search
CPC .......... C25B 15/02; C25B 15/08; C25B 9/00; C25B 9/06; C25B 9/18; C25B 1/26
See application file for complete search history.

(56) References Cited

U.S. PATENT DOCUMENTS

2016/0029639 A1 * 2/2016 DiMascio ................ C02F 1/76
424/665

OTHER PUBLICATIONS

Chen, X; "Aqueous chlorine dioxide generating system comprises water storage device, electrolyte storage device, electrolytic device, reaction device, storage device and cooling device that is set with cleaning device"; 2015; abstract. (Year: 2015).*

* cited by examiner

Primary Examiner — Zulmariam Mendez
(74) Attorney, Agent, or Firm — Leong C. Lei

(57) ABSTRACT

The production system of chlorine dioxide solution includes a water storage device, an electrolyte storage device, an electrolytic device, a reaction device, a storage device, a cooling device, and a cleaning device. These devices jointly work together to manufacture chlorine dioxide solution systematically and in mass production.

4 Claims, 11 Drawing Sheets

PRODUCTION SYSTEM FOR CHLORINE DIOXIDE SOLUTION

CROSS-REFERENCE TO RELATED APPLICATIONS

This is a divisional application of co-pending patent application Ser. No. 16/239,539, filed on Jan. 4, 2019.

BACKGROUND OF THE INVENTION

(a) Technical Field of the Invention

The present invention is generally related to chlorine dioxide, and more particular to a system for manufacturing chlorine dioxide solution systematically and in mass production.

(b) Description of the Prior Art

Chlorine dioxide ($ClO_2$) has a pair of free active electrons and therefore has a strong oxidizing capability for destroying pathogens such as bacteria, viruses, fungi. Chlorine dioxide in the gaseous form is not convenient to apply and is often dissolved in water to form chlorine dioxide solution for application in disinfection, sterilization, and deodorization.

Chlorine dioxide solution may be formed by combining chlorifes with acids and mixing the combination with an appropriate amount of water so that the chlorifes may react with the acids to form chlorine dioxide. This is a troublesome process. Amore common method is to electrolyze saline solution to produce chlorine dioxide gas, and then to dissolve the gas in the water. This method is safer and more convenient, but the chlorine dioxide gas has to be pumped into water. This method has limited productivity and increased cost as multiple electrolysis apparatuses and pumps are required.

SUMMARY OF THE INVENTION

Therefore, the present invention's objective is to obviate the above shortcomings and to provide a system for manufacturing chlorine dioxide solution systematically and in mass production.

To achieve the objective, the system for manufacturing chlorine dioxide solution, comprises a water storage device, an electrolyte storage device, an electrolytic device, a reaction device, a storage device, a cooling device, and a cleaning device.

The water storage device is for storing water and is connected to the reaction device, where water stored in the water storage device is provided to and used by the reaction device.

The electrolyte storage device is for storing electrolyte and is connected to the electrolytic device, where electrolyte in the electrolyte storage device is provided to and used by the electrolytic device.

The electrolytic device is connected to the electrolyte storage device and the reaction device, where the electrolytic device electrolyzes electrolyte through electrolysis reaction to produce chlorine dioxide gas, and provides the chlorine dioxide gas to the reaction device.

The reaction device is connected to the water storage device and the electrolytic device, where the reaction device mixes water from the water storage device and chlorine dioxide gas from the electrolytic device to form chlorine dioxide solution.

The storage device is connected to the reaction device for storing the chlorine dioxide solution produced from the reaction device.

The cooling device is connected to the electrolytic device for conducting heat exchange with the electrolytic device so as to cooling down the electrolytic device's high temperature from electrolysis reaction.

The cleaning device is connected to the electrolytic device for cleaning alkaline waste liquid residual from electrolysis reaction in the electrolytic device.

Through the above devices, a system for manufacturing chlorine dioxide solution systematically and in mass production is achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
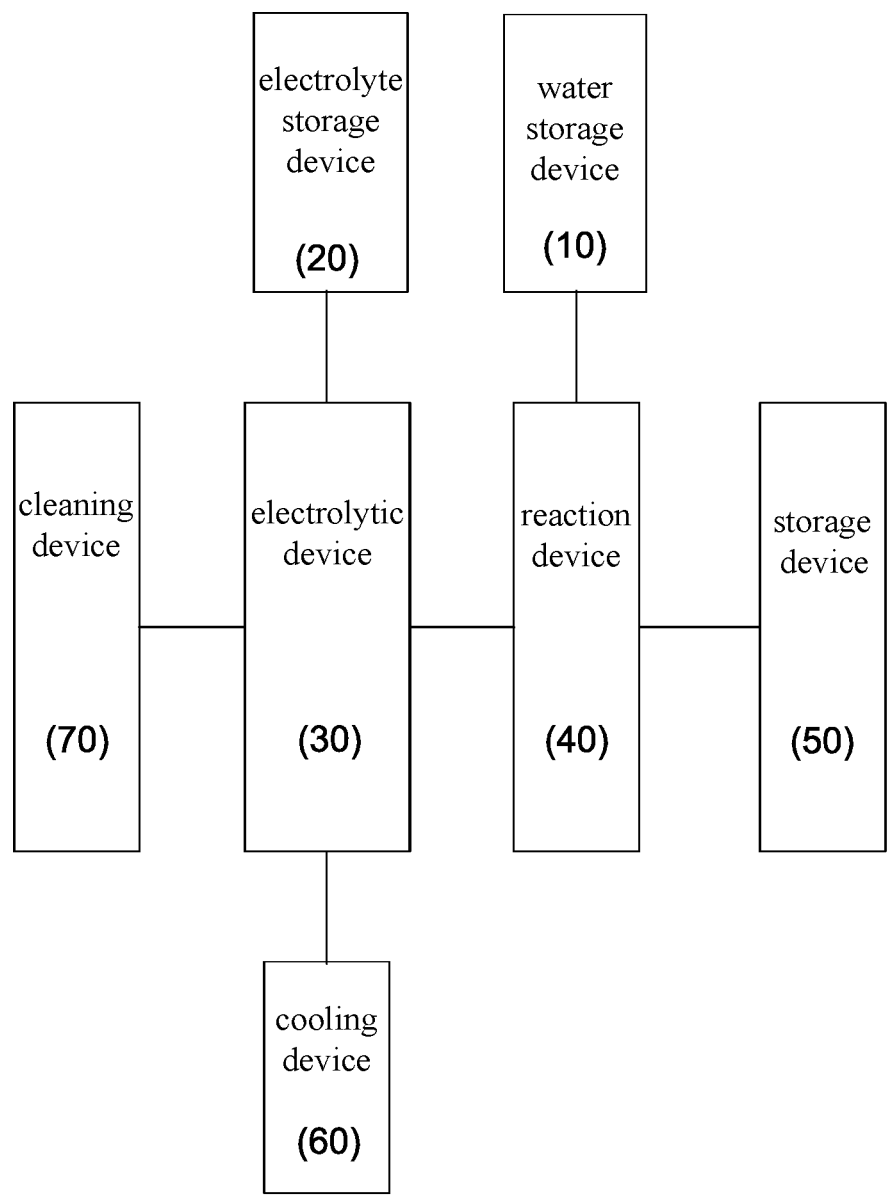
FIG. 1 is a block diagram showing a system for manufacturing chlorine dioxide solution according to the present invention.

As shown in FIG. 1, a system for manufacturing chlorine dioxide solution according to the present invention includes a water storage device 10, an electrolyte storage device 20, an electrolytic device 30, a reaction device 40, a storage device 50, a cooling device 60, and a cleaning device 70.

The water storage device 10 is for storing water and is connected to the reaction device 40. Water stored in the water storage device 10 is provided to and used by the reaction device 40.

The electrolyte storage device 20 is for storing electrolyte and is connected to the electrolytic device 30. Electrolyte in the electrolyte storage device 20 is provided to and used by the electrolytic device 30.

The electrolytic device 30 is connected to the electrolyte storage device 20 and the reaction device 40. The electrolytic device 30 electrolyzes electrolyte to produce chlorine dioxide gas, and provides the chlorine dioxide gas to the reaction device 40 to produce chlorine dioxide solution by mixing the chlorine dioxide gas with water.

The reaction device 40 is connected to the water storage device 10 and the electrolytic device 30. The reaction device 40 mixes water from the water storage device 10 and chlorine dioxide gas from the electrolytic device 30 to form chlorine dioxide solution.

The storage device 50 is connected to the reaction device 40 for storing the chlorine dioxide solution produced from the reaction device 40.

The cooling device 60 is connected to the electrolytic device 30. The cooling device 60 conducts heat exchange with the electrolytic device 30 so as to cooling down the electrolytic device 30's high temperature from electrolysis reaction.

The cleaning device 70 is connected to the electrolytic device 30 for cleaning alkaline waste liquid residual from the electrolysis reaction in the electrolytic device 30.

Through the above devices, water from the water storage device 10 is supplied to the reaction device 40, and electrolyte from the electrolyte storage device 20 is supplied to the electrolytic device 30. Then, chlorine dioxide gas is produced by electrolyzing electrolyte in the electrolytic device 30 and the chlorine dioxide gas is supplied to the reaction device 40. The chlorine dioxide gas is mixed with water in the reaction device 40 to form chlorine dioxide solution, and the chlorine dioxide solution is supplied to the storage device 50 for storage. In the meantime, the cooling device 60 cools down the electrolytic device 30 during electrolysis reaction. After the production of chlorine dioxide solution is completed, the cleaning device 70 cleans the electrolytic device 30 so that it is ready for a next round of chlorine dioxide solution production.

Figure 2:
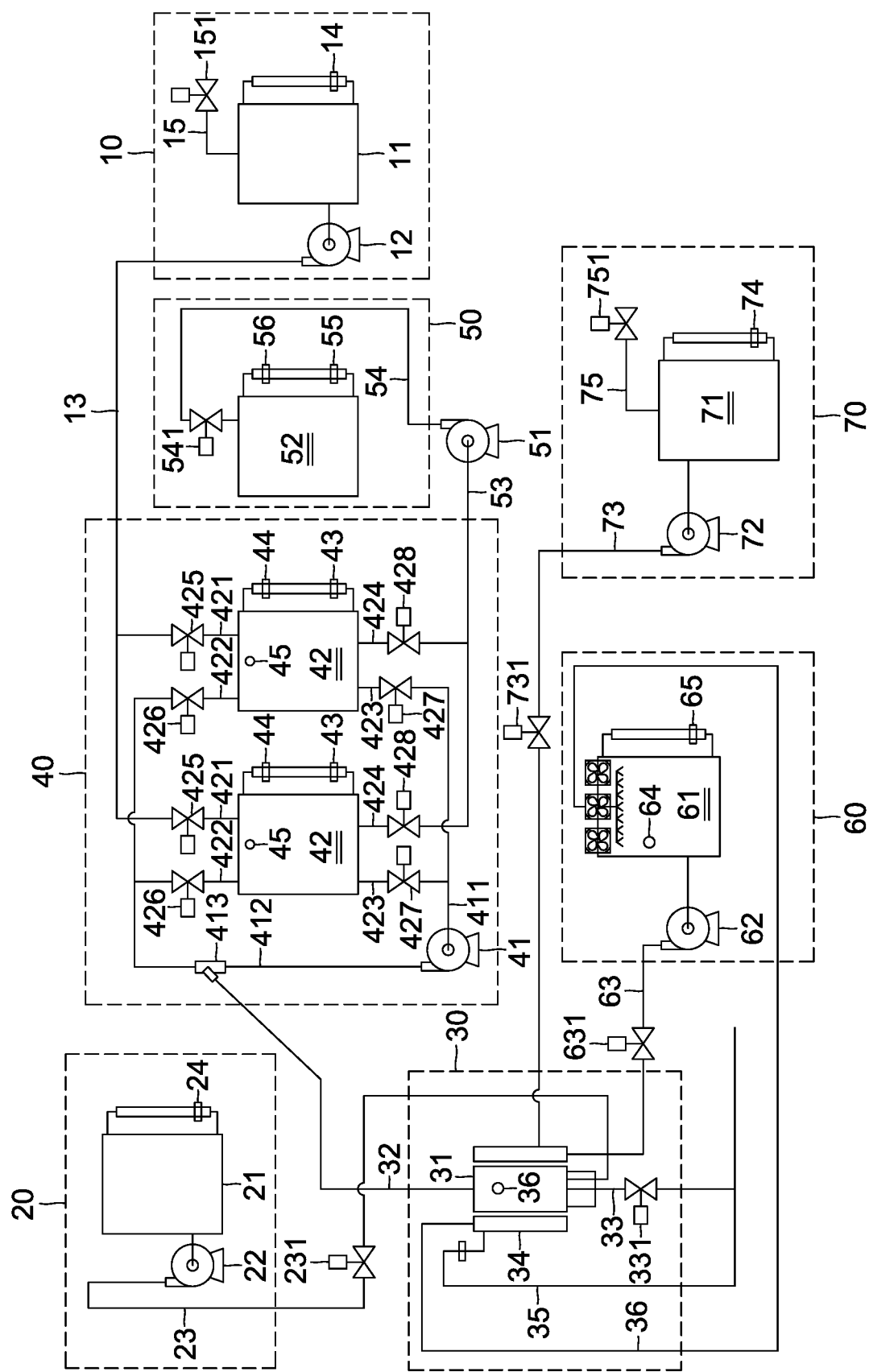
FIG. 2 is a schematic diagram showing an embodiment of the system for manufacturing chlorine dioxide solution of FIG. 1.

As shown in FIG. 2, the water storage device 10 includes a water tank 11, a water pump 12 connected to the water tank 11, and a water pipe 13 connecting the water pump 12 with the reaction device 40. The water tank 11 includes a low-level detector 14 detecting water level in the water tank 11 and an inlet 15 connecting to a water source (not shown). The inlet 15 is configured with a pressure valve 151. When the low-level detector 14 detects that there is too little water in the water tank 11, the pressure valve 151 is engaged so that water is supplemented into the water tank 11 through the inlet 15. Water is preferably from reverse osmosis (RO).

As shown in FIG. 2, the electrolyte storage device 20 includes a electrolyte tank 21, a electrolyte pump 22 connected to the electrolyte tank 21, and a electrolyte pipe 23 connecting the electrolyte pump 22 with the electrolytic device 30. The electrolyte tank 21 includes a low-level detector 24 detecting whether electrolyte level in the electrolyte tank 21 is too little. The electrolyte pipe 23 is configured with a pressure valve 231.

As shown in FIG. 2, the electrolytic device 30 includes an electrolytic tank 31 connected to the electrolyte tank 21 through the electrolyte pipe 23, a gas pipe 32 connecting the electrolytic tank 31 to the reaction device 40 for supplying chlorine dioxide gas, a waste discharge pipe 33 connecting the electrolytic tank 31 for discharging cleaning water or salty water from the electrolytic tank 31, a cooler 34 for cooling down the electrolytic tank 31, coolant discharge pipe 35 connecting the cooler 34 to the waste discharge pipe 33, and a reflow pipe 36 connecting the cooler 34 to the cooling device 60 for recycling coolant. The waste discharge pipe 33 is configured with a pressure valve 331 capable of acid and alkali resistance.

As shown in FIG. 2, the reaction device 40 includes a pump 41 and a number of reaction tanks 42. The pump 41 has an inlet pipe 411 and an outlet pipe 412. The outlet pipe 412 is configured with a mixer 413 whose inlet is connected to the gas pipe 32 of the electrolytic device 30. Each reaction tank 42 has a first inlet pipe 421, a second inlet pipe 422, a first outlet pipe 423, and a second outlet pipe 424. The first inlet pipe 421 is connected to the water pipe 13 of the water tank 11. The second inlet pipe 422 is connected to the outlet pipe 412 of the pump 41. The first outlet pipe 423 is connected to the inlet pipe 411 of the pump 41. The first inlet pipe 421 is configured with a pressure valve 425, and the second inlet pipe 422, first outlet pipe 423, and second outlet pipe 424 are respectively configured with pressure valves 426, 427, 428, all capable of acid and alkali resistance. Furthermore, there are a low-level detector 43 and a high-level detector 44 detecting the level of chlorine dioxide solution in the reaction tank 42.

As shown in FIG. 2, the storage device 50 includes a solution tank 52 for storing chlorine dioxide solution, a solution pump 51, a solution outlet pipe 54 connecting the solution pump 51 to the solution tank 52, a solution inlet pipe 53 connecting the solution pump 51 to the second outlet pipe 424 of the reaction device 40, and a low-level detector 55 and a high-level detector 56 detecting chlorine dioxide solution level inside the solution tank 52. The solution outlet pipe 54 is configured with a pressure valve 541 capable of acid and alkali resistance.

As shown in FIG. 2, the cooling device 60 includes a coolant tank 61, coolant tank 61 for storing coolant, a coolant pump 62 connecting the coolant tank 61, a coolant pipe 63 connecting the coolant pump 62 to the cooler 34 of the electrolytic device 30, and a low-level detector 64 detecting whether the coolant in the coolant tank 61 is too little. The coolant pipe 63 is configured with a pressure valve 631. The coolant tank 61 is also connected to the reflow pipe 36 of the electrolytic device 30 for recycling coolant.

As shown in FIG. 2, the cleaning device 70 includes a clear water tank 71 for storing clear water, a clear water pump 72 connecting the clear water tank 71, a clear water pipe 73 connecting the clear water pump 72 to the electrolytic device 30, a low-level detector 74 detecting whether the clear water in the clear water tank 70 is too little, a clear water inlet pipe 75 connecting the clear water tank 71 to a clear water source (not shown). The clear water pipe 73 is configured with a pressure valve 731 and the clear water inlet pipe 75 is configured with a pressure valve 751. When the low-level detector 74 detects that there is too little clear water in the clear water tank 71, the pressure valve 751 is engaged so that clear water is introduced from the clear water source into the clear water tank 71.

Figure 3:
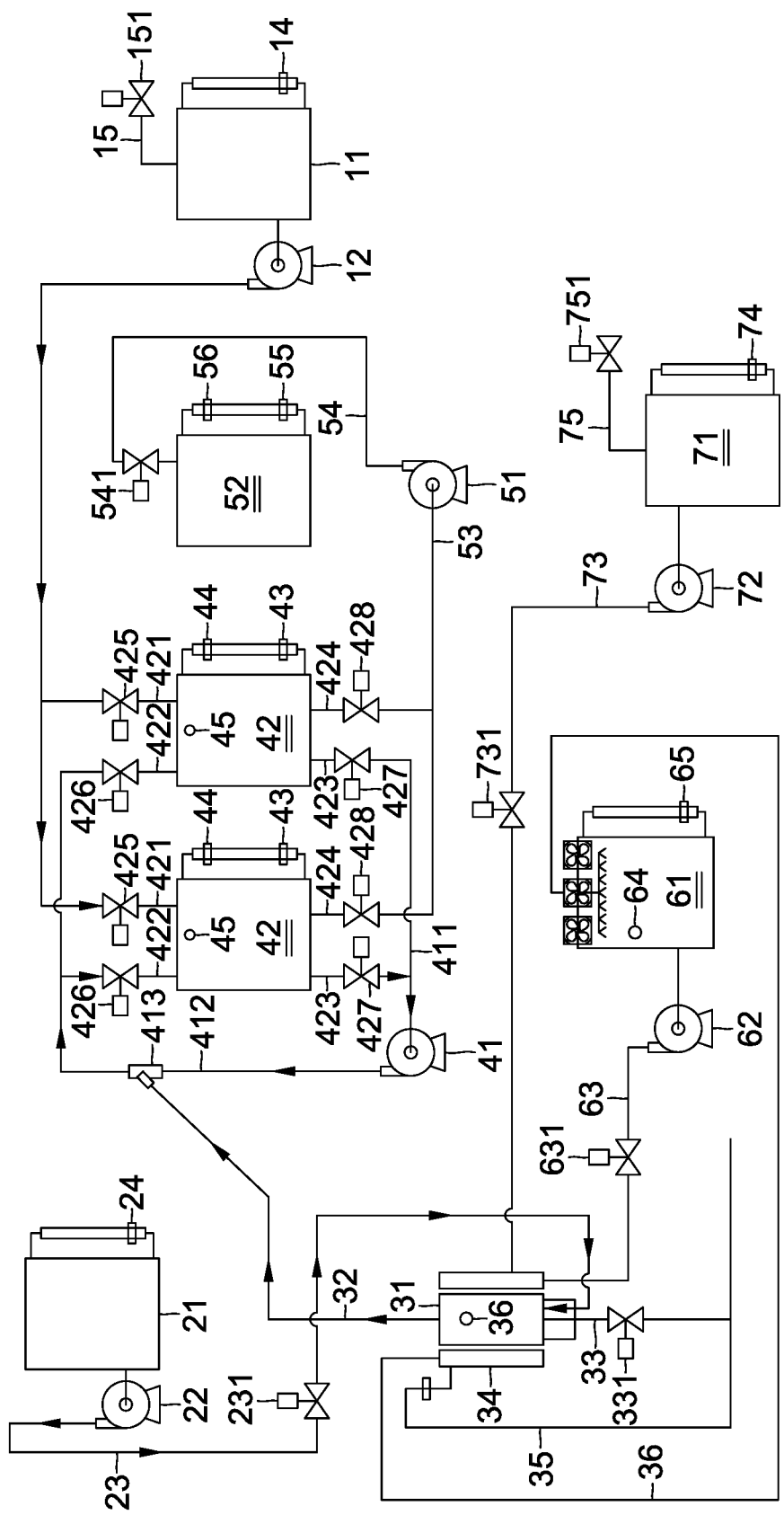
FIG. 3 depicts a scenario of the system for manufacturing chlorine dioxide solution where only a reaction tank is employed.

FIG. 3 depicts a scenario where only one of the reaction tanks 42 is used to produce chlorine dioxide solution. First, the pressure valves 425, 426, and 427 respectively on the first inlet pipe 421, the second inlet pipe 422, and the first outlet pipe 423 are opened, RO water stored in the water tank 11 is pumped into the reaction tank 42 through the water pipe 13 by the pump 12. The liquid in the reaction tank 42 is then pumped by the pump 41 to flow through the first outlet pipe 423, the inlet pipe 411, the pump 41, the outlet pipe 412, the mixer 413, and the second inlet pipe 422 back into the reaction tank 42 so that the liquid in the reaction tank 42 is recycled. In the meantime, the electrolyte stored in the electrolyte tank 21 is pumped into electrolytic tank 31 through the electrolyte pipe 23 by the electrolyte pump 22. The electrolyte is electrolyzed by electrolytic device 30 to produce chlorine dioxide gas and alkaline waste liquid. The chlorine dioxide gas is introduced into the gas pipe 32. Due to a suction force exerted from the mixer 413 as liquid passes through the mixer 413, the chlorine dioxide gas in the gas pipe 32 is then sucked into the mixer 413 and mixes with liquid in the mixer 413 to form chlorine dioxide solution. The chlorine dioxide solution enters the reaction tank 42 through the second inlet pipe 422. According to a required concentration for the chlorine dioxide solution, whether water in the water tank 11 is further introduced into the reaction tank 42 may be controlled. Similarly, whether more liquid from the reaction tank 42 is further pumped through the mixer 413 by the pump 41 to mix with the chlorine dioxide gas may be controlled to increase or lower the concentration of chlorine dioxide solution.

Figure 4:
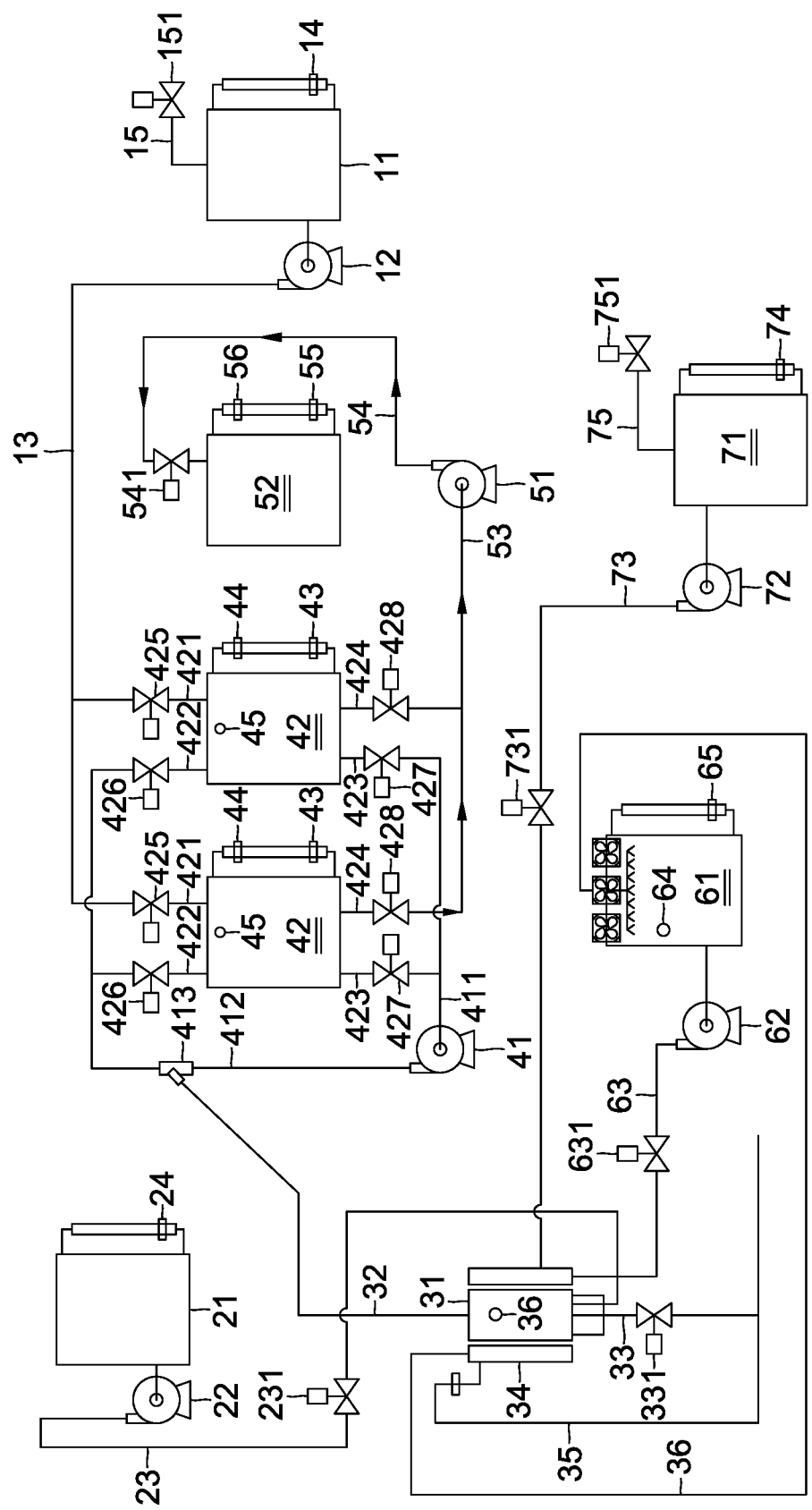
FIG. 4 depicts another scenario of the system for manufacturing chlorine dioxide solution where only a reaction tank is employed.

After the chlorine dioxide solution in the reaction tank 42 reaches the required concentration, and the high-level detector 44 of the reaction tank 42 detects that the chlorine dioxide solution reaches a high level, the pump 41 is shut down, and the pressure valves 425, 426, 427, respectively on the first inlet pipe 421, the second inlet pipe 422, and the first outlet pipe 423 are closed so that water in the water tank 11 does not enter the reaction tank 42, and the chlorine dioxide solution in the reaction tank 42 is not further recycled to mix with the chlorine dioxide gas. The pressure valve 428 on the second outlet pipe 424 is opened and the chlorine dioxide solution in the reaction tank 42 is pumped into and stored in the solution tank 52 through the solution inlet pipe 53 and the solution outlet pipe 54 by the solution pump 51 as shown in FIG. 4.

Figure 5:
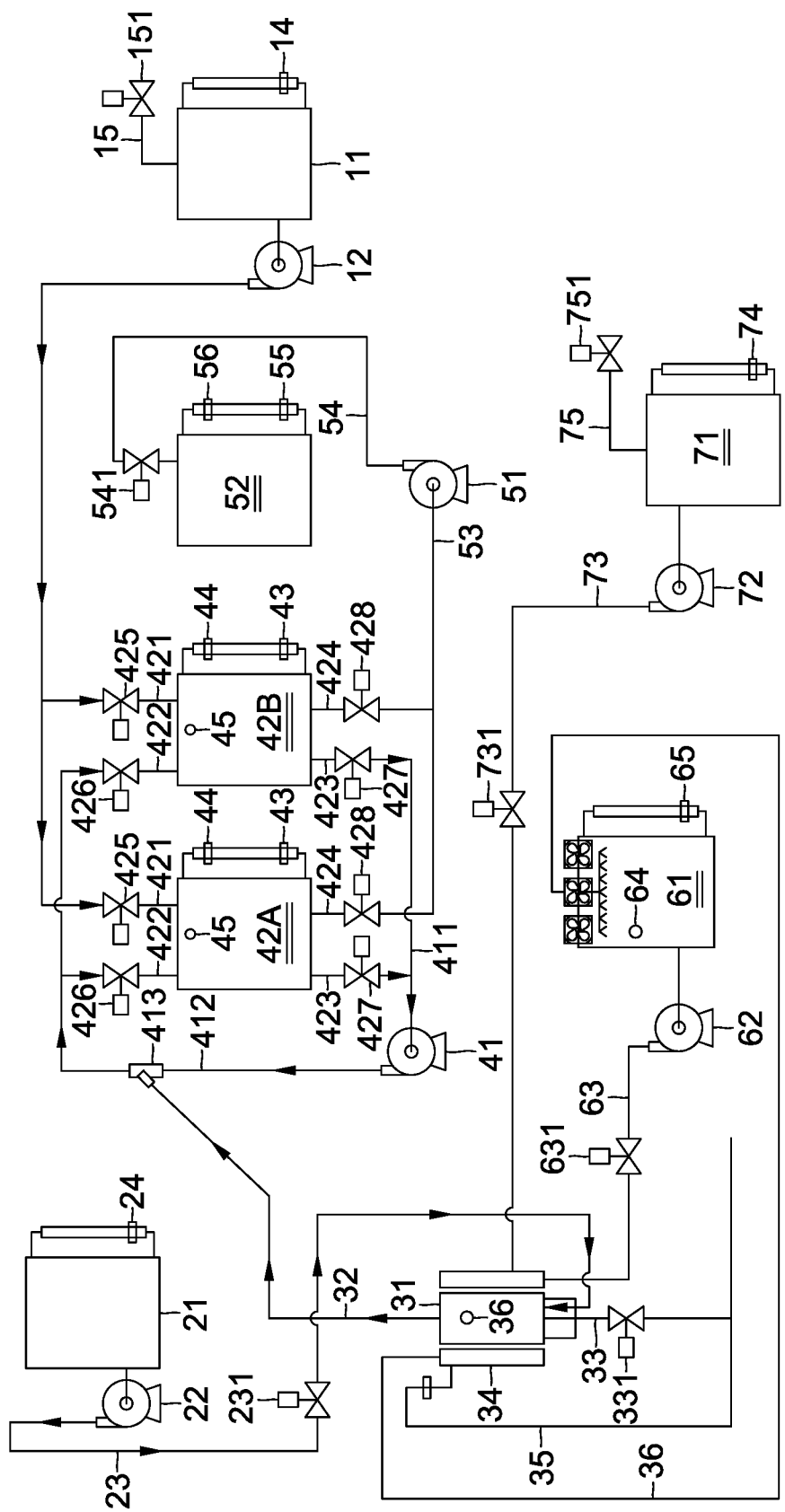
FIG. 5 depicts a scenario of the system for manufacturing chlorine dioxide solution where two reaction tanks are employed simultaneously.
Figure 6:
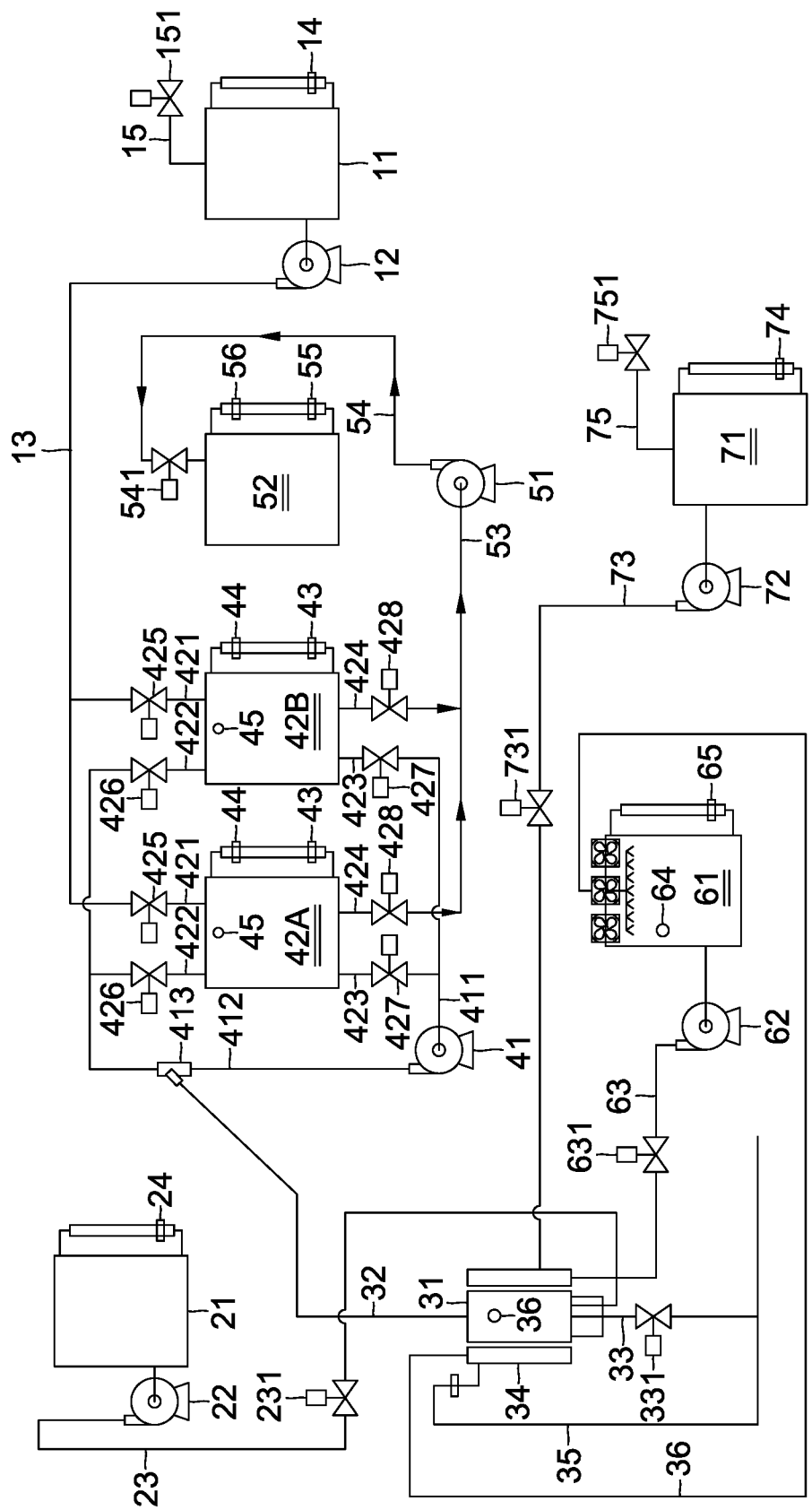
FIG. 6 depicts another scenario of the system for manufacturing chlorine dioxide solution two reaction tanks are employed simultaneously.

FIG. 5 depicts a scenario where two reaction tanks 42A and 42B are used together to produce chlorine dioxide solution. First, the pressure valves 425, 426, and 427 respectively on the first inlet pipes 421, the second inlet pipes 422, and the first outlet pipes 423 of the reaction tanks 42A and 42B are opened, RO water stored in the water tank 11 is pumped into the reaction tanks 42A and 42B through the water pipe 13 by the pump 12. The liquid in the reaction tanks 42A and 42B is then pumped by the pump 41 to flow through the first outlet pipes 423, the inlet pipe 411, the pump 41, the outlet pipe 412, the mixer 413, and the second inlet pipes 422 back into the reaction tanks 42A and 42B so that the liquid in the reaction tanks 42A and 42B is recycled. In the meantime, the electrolyte stored in the electrolyte tank 21 is pumped into electrolytic tank 31 through the electrolyte pipe 23 by the electrolyte pump 22. The electrolyte is electrolyzed by electrolytic device 30 to produce chlorine dioxide gas and alkaline waste liquid. The chlorine dioxide gas is introduced into the gas pipe 32. Due to a suction force exerted from the mixer 413 as liquid passes through the mixer 413, the chlorine dioxide gas in the gas pipe 32 is then sucked into the mixer 413 and mixes with liquid in the mixer 413 to form chlorine dioxide solution. The chlorine dioxide solution enters the reaction tanks 42A and 42B through the second inlet pipes 422. According to a required concentration for the chlorine dioxide solution, whether water in the water tank 11 is further introduced into the reaction tanks 42A and 42B may be controlled. Similarly, whether more liquid from the reaction tanks 42A and 42B is further pumped through the mixer 413 by the pump 41 to mix with the chlorine dioxide gas may be controlled to increase or lower the concentration of chlorine dioxide solution. After the chlorine dioxide solution in the reaction tanks 42A and 42B reaches the required concentration, and the high-level detectors 44 of the reaction tanks 42A and 42B detect that the chlorine dioxide solution reaches a high level, the pump 41 is shut down, and the pressure valves 425, 426, 427, respectively on the first inlet pipes 421, the second inlet pipes 422, and the first outlet pipes 423 are closed so that water in the water tank 11 does not enter the reaction tanks 42A and 42B, and the chlorine dioxide solution in the reaction tanks 42A and 42B is not further recycled to mix with the chlorine dioxide gas. The pressure valves 428 on the second outlet pipes 424 are opened and the chlorine dioxide solution in the reaction tanks 42A and 42B is pumped into and stored in the solution tank 52 through the solution inlet pipe 53 and the solution outlet pipe 54 by the solution pump 51 as shown in FIG. 6. As illustrated by the present invention, the employment of multiple reaction tanks 42 may effectively increase the production yield and efficiency of chlorine dioxide solution.

Figure 7:
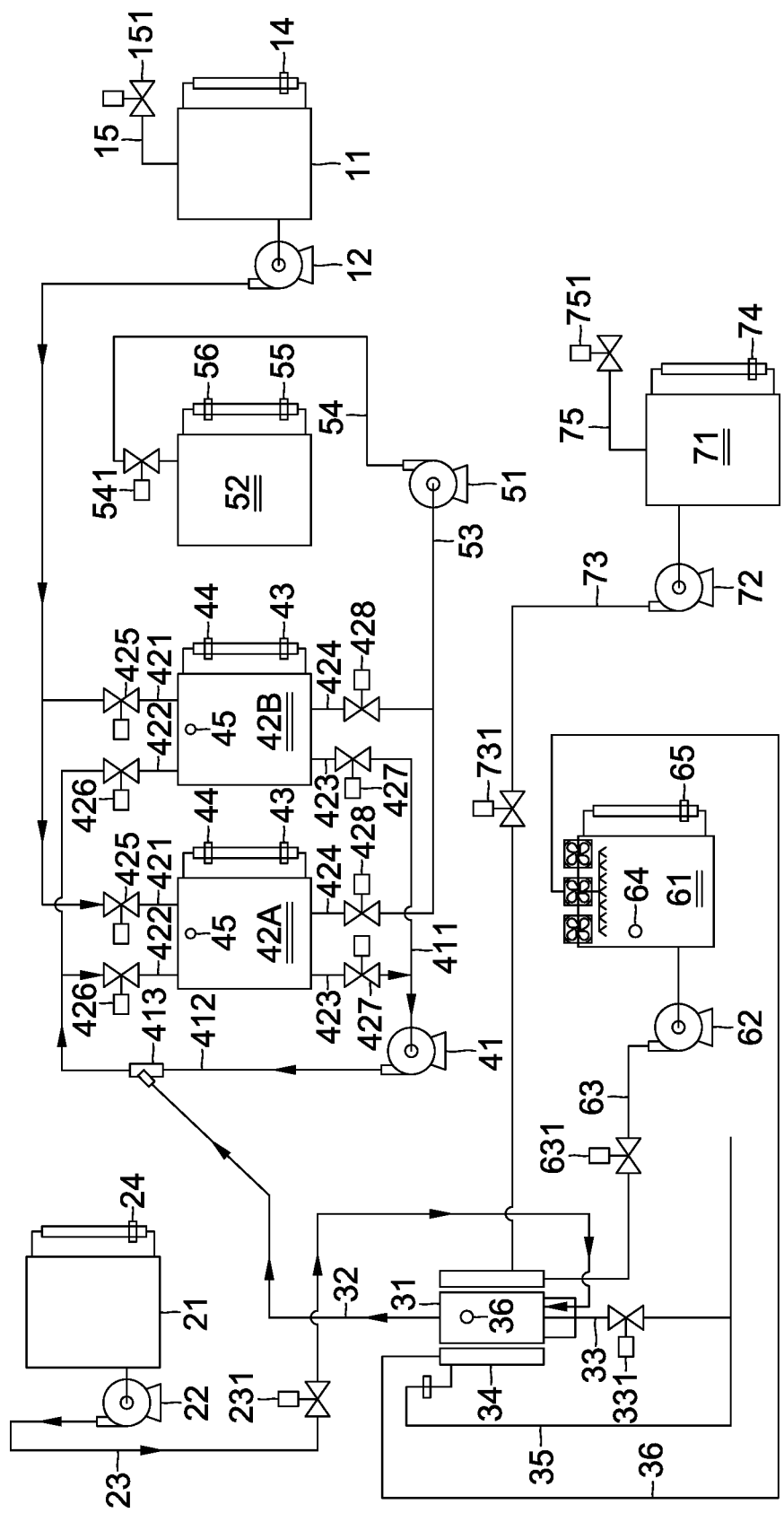
FIG. 7 depicts a scenario of the system for manufacturing chlorine dioxide solution where two reaction tanks are employed alternately.
Figure 8:
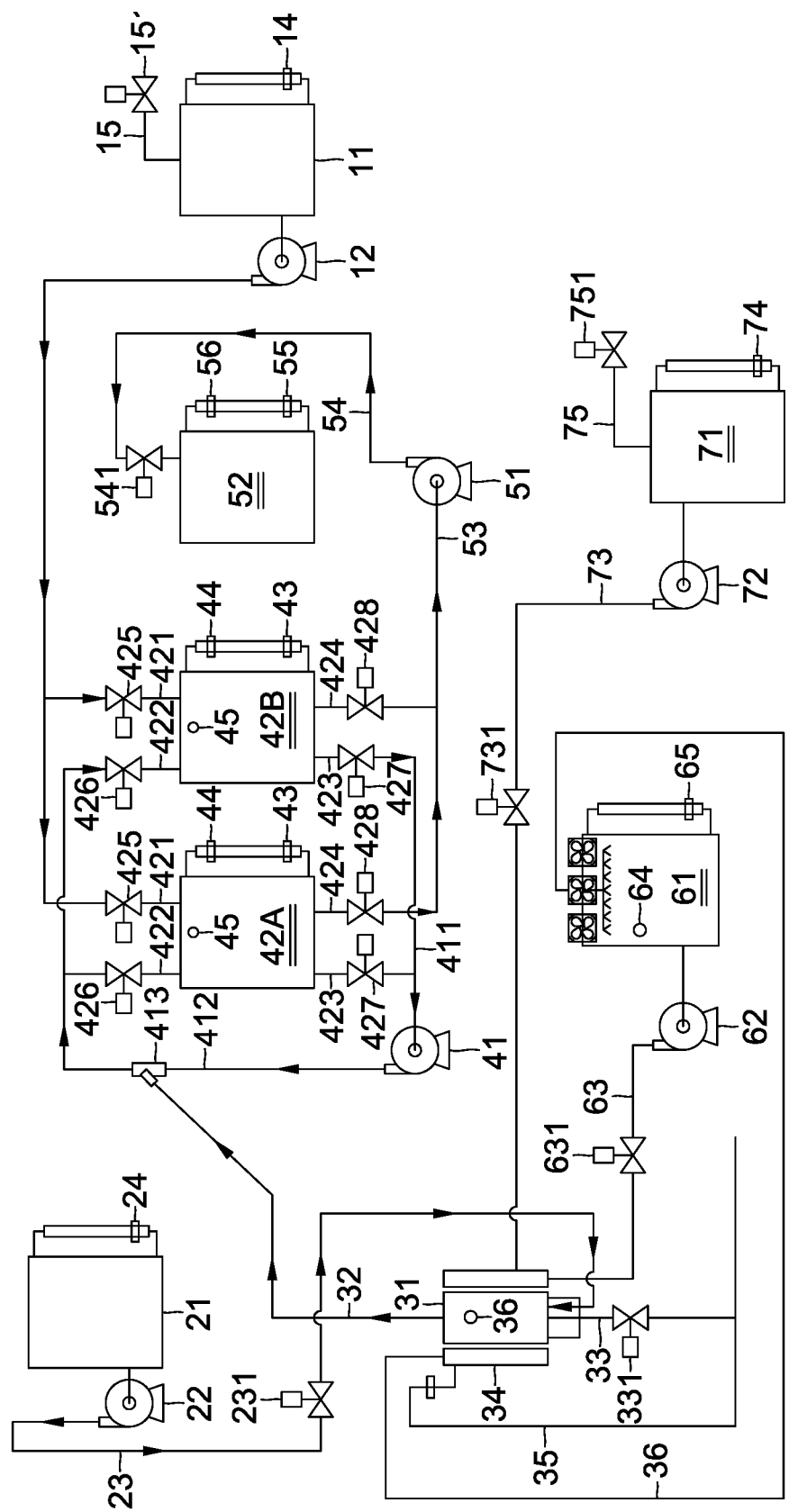
FIG. 8 depicts another scenario of the system for manufacturing chlorine dioxide solution where two reaction tanks are employed alternately.
Figure 9:
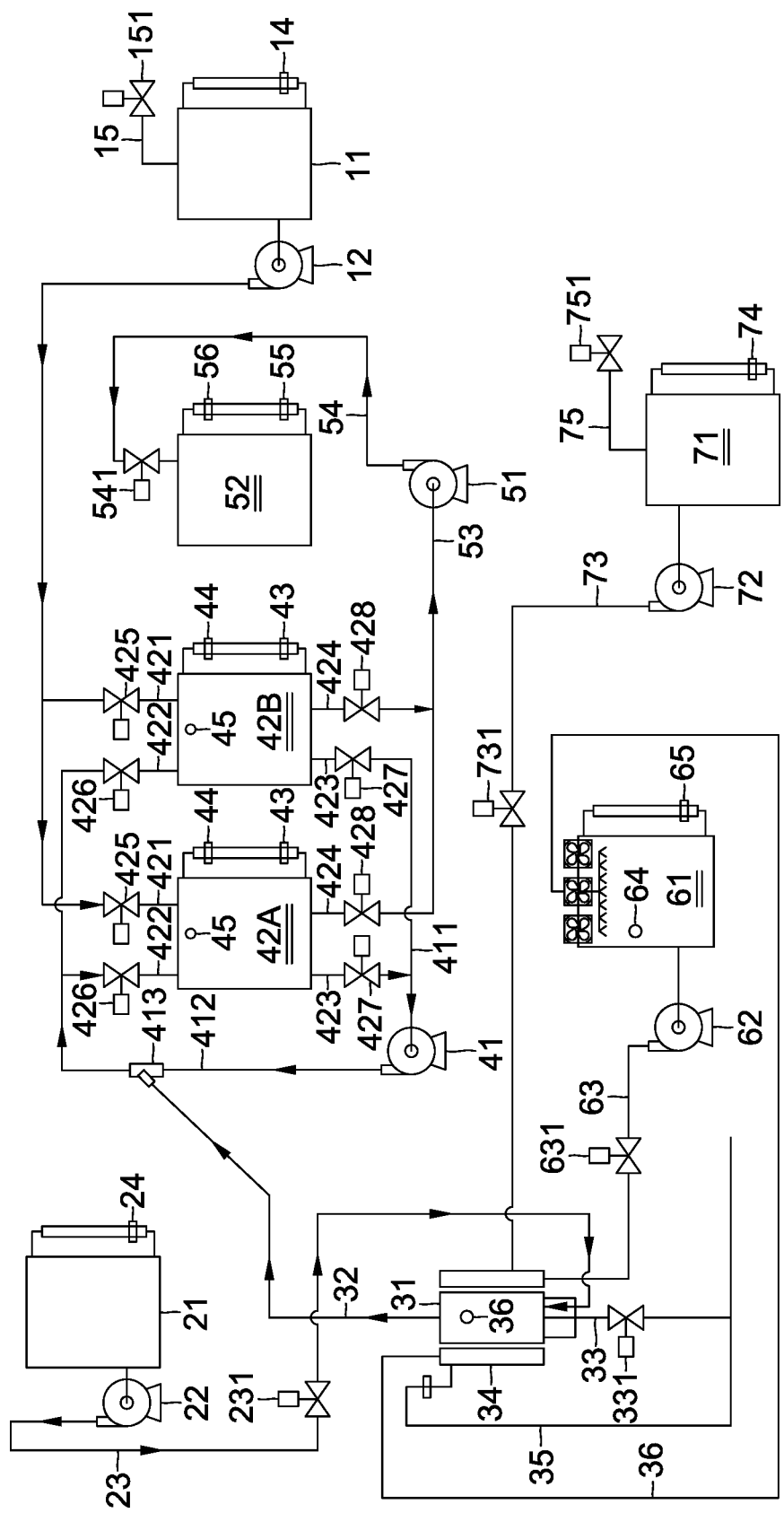
FIG. 9 depicts yet another scenario of the system for manufacturing chlorine dioxide solution where two reaction tanks are employed alternately.

FIG. 7 depicts a scenario where two reaction tanks 42A and 42B are used alternately to produce chlorine dioxide solution. First, the pressure valves 425, 426, and 427 respectively on the first inlet pipe 421, the second inlet pipe 422, and the first outlet pipe 423 of a first reaction tank 42A are opened, RO water stored in the water tank 11 is pumped into the reaction tank 42A through the water pipe 13 by the pump 12. The liquid in the reaction tank 42A is then pumped by the pump 41 to flow through the first outlet pipe 423, the inlet pipe 411, the pump 41, the outlet pipe 412, the mixer 413, and the second inlet pipe 422 back into the reaction tank 42A so that the liquid in the reaction tank 42A is recycled. In the meantime, the electrolyte stored in the electrolyte tank 21 is pumped into electrolytic tank 31 through the electrolyte pipe 23 by the electrolyte pump 22. The electrolyte is electrolyzed by electrolytic device 30 to produce chlorine dioxide gas and alkaline waste liquid. The chlorine dioxide gas is introduced into the gas pipe 32. Due to a suction force exerted from the mixer 413 as liquid passes through the mixer 413, the chlorine dioxide gas in the gas pipe 32 is then sucked into the mixer 413 and mixes with liquid in the mixer 413 to form chlorine dioxide solution. The chlorine dioxide solution enters the reaction tank 42A through the second inlet pipe 422. According to a required concentration for the chlorine dioxide solution, whether water in the water tank 11 is further introduced into the reaction tank 42A may be controlled. Similarly, whether more liquid from the reaction tank 42A is further pumped through the mixer 413 by the pump 41 to mix with the chlorine dioxide gas may be controlled to increase or lower the concentration of chlorine dioxide solution. After the chlorine dioxide solution in the reaction tank 42A reaches the required concentration, the pressure valves 425, 426, 427, respectively on the first inlet pipe 421, the second inlet pipe 422, and the first outlet pipe 423 of the first reaction tank 42A are closed so that the reaction tank 42A stops liquid recycling and production of chlorine dioxide solution. Then, as shown in FIG. 8, the pressure valve 428 on the second outlet pipe 424 is opened and the chlorine dioxide solution in the reaction tank 42A is pumped into and stored in the solution tank 52 through the solution inlet pipe 53 and the solution outlet pipe 54 by the solution pump 51. In the meantime, the pressure valves 425, 426, and 427 respectively on the first inlet pipe 421, the second inlet pipe 422, and the first outlet pipe 423 of a second reaction tank 42B are opened, RO water stored in the water tank 11 is pumped into the reaction tank 42B through the water pipe 13 by the pump 12. The liquid in the reaction tank 42B is recycled through the mixer 413 by the pump 41. Then, the chlorine dioxide gas produced by the electrolytic device 30 mixes with liquid in the mixer 413 to form chlorine dioxide solution. The chlorine dioxide solution enters the reaction tank 42B. After the chlorine dioxide solution in the reaction tank 42B reaches a high level, the pressure valves 425, 426, 427, respectively on the first inlet pipe 421, the second inlet pipe 422, and the first outlet pipe 423 of the second reaction tank 42B are closed so that the reaction tank 42B stops liquid recycling and production of chlorine dioxide solution. Then, the production process on the first reaction tank 42A is restarted while the pressure valve 428 on the second outlet pipe 424 of the second reaction tank 42B is opened and the chlorine dioxide solution in the reaction tank 42B is pumped into and stored in the solution tank 52 as shown in FIG. 9. Therefore, by having multiple reaction tanks 42 and using them alternately for production, the water storage device 10, the electrolytic device 30, and the reaction device 40 may continuously produce chlorine dioxide solution, thereby achieving enhanced yield and efficiency of chlorine dioxide solution.

Figure 10:
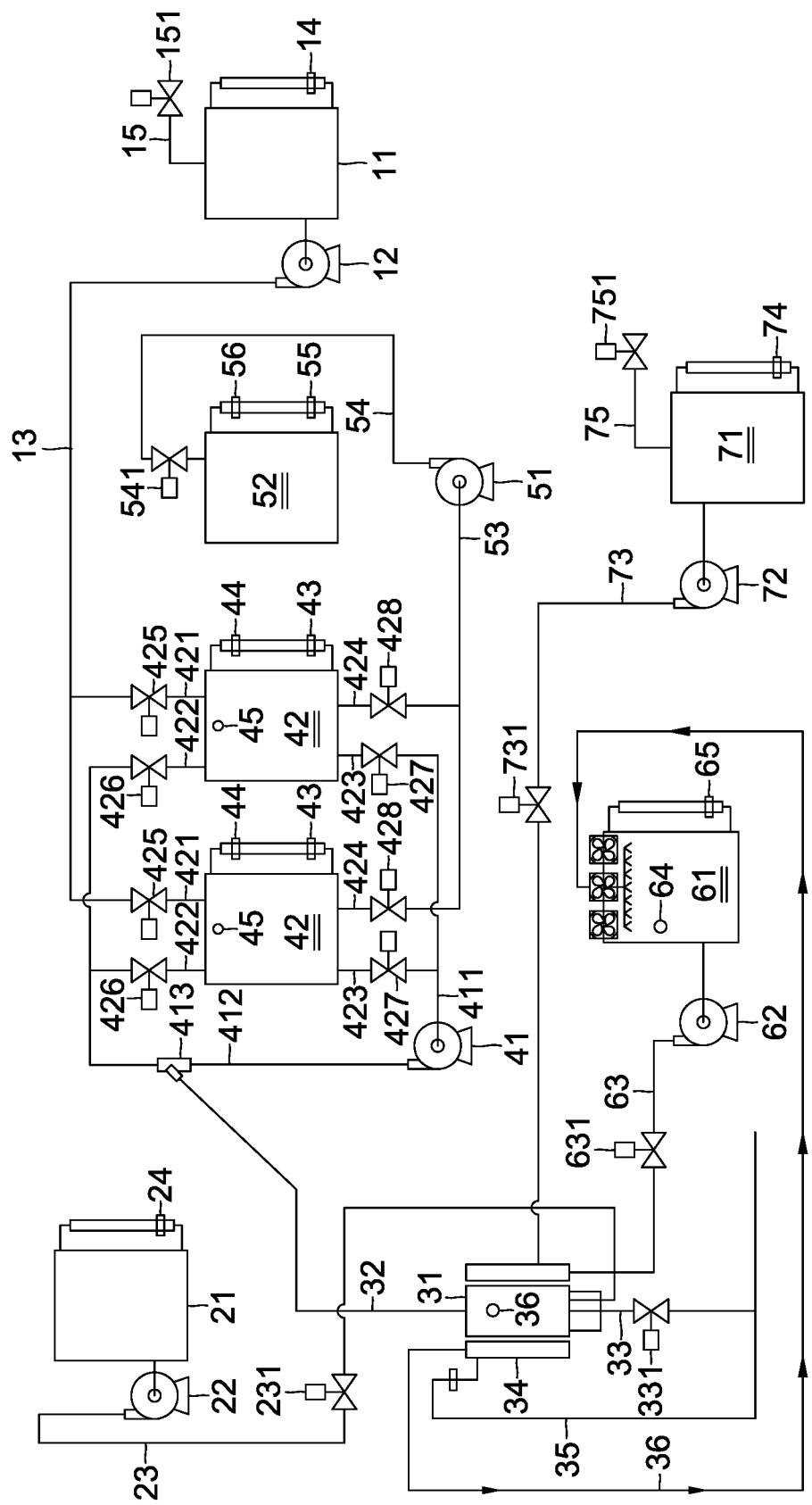
FIG. 10 depicts a scenario of the system for manufacturing chlorine dioxide solution where electrolytic device is cooled down by cooling device's supplying coolant.

As shown in FIG. 10, as heat is produced during the electrolysis operation of the electrolytic device 30, causing the electrolytic device 30's temperature to rise and compromising the electrolytic effect, the pressure valve 631 on the coolant pipe 63 of the cooling device 60 is opened and coolant in the coolant tank 61 is supplied to the cooler 34 of the electrolytic device 30 by the coolant pump 62 for heat exchange, thereby lowering the temperature of the electrolytic tank 31. Then, the coolant in the cooler 34 having higher temperature from heat exchange flows back the coolant tank 61 through the reflow pipe 36 so that it is cooled down and may be reused again.

Figure 11:
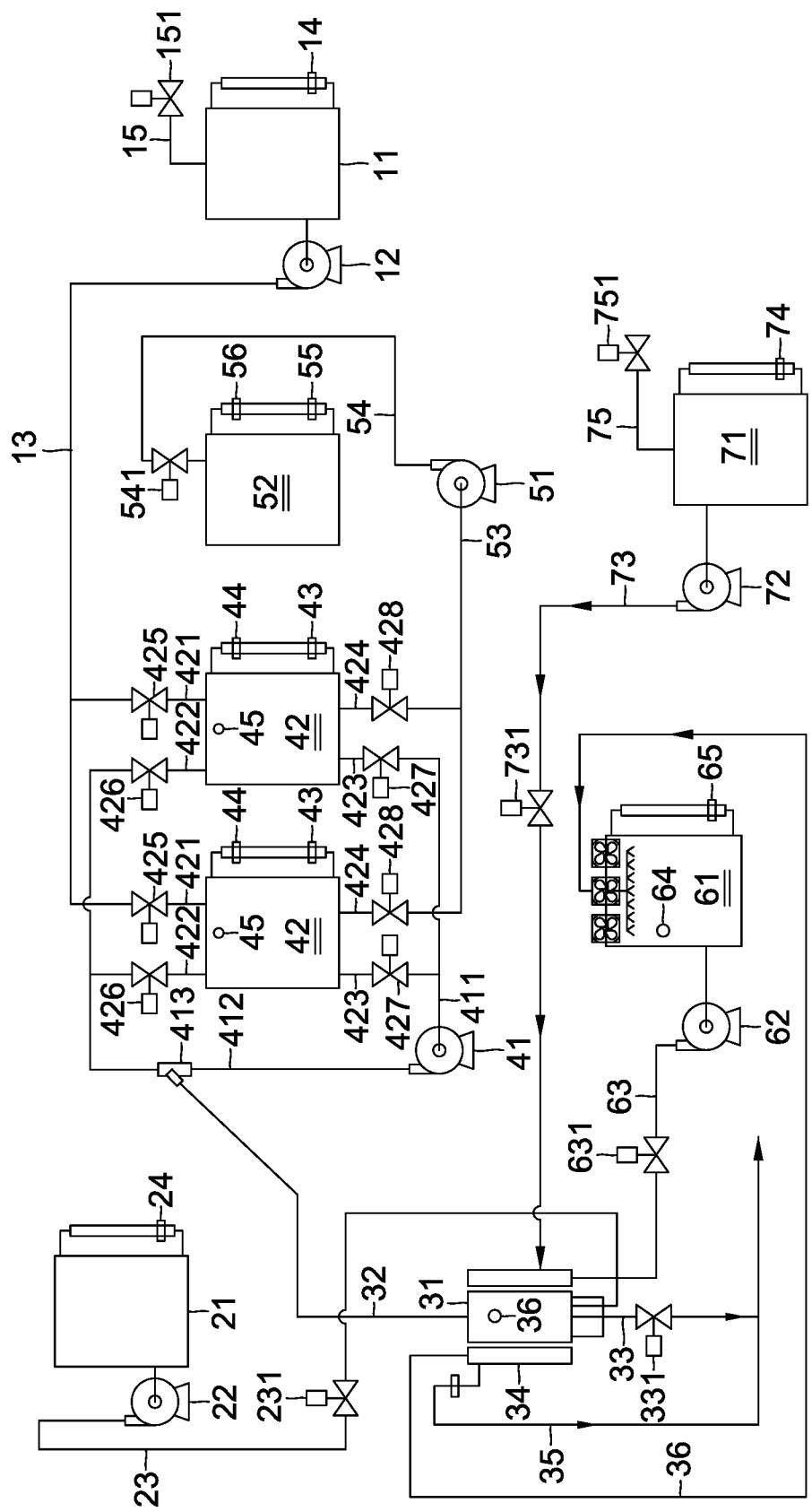
FIG. 11 depicts a scenario of the system for manufacturing chlorine dioxide solution where electrolytic device is cleaned by cleaning device's supplying clear water.

As shown in FIG. 11, after the production of the chlorine dioxide solution is finished, the pressure valve 331 on the waste discharge pipe 33 of the electrolytic device 30 is opened and alkaline waste liquid from electrolysis in the electrolytic device 30 is expelled. Then, the pressure valve 731 on the clear water pipe 73 is opened and the clear water pump 72 of the cleaning device 70 is turned on, clear water is then pumped from the clear water tank 71 by the clear water pump 72 to enter the electrolytic device 30 through 73 the clear water pump 72 and the clear water pipe 73. Residual alkaline liquid waste is as such cleaned from the electrolytic device 30. The alkaline waste liquid and the water after cleaning is expelled through the waste discharge pipe 33 and the coolant discharge pipe 35.

Preferably, a temperature sensor 37 is configured on the electrolytic tank 31 to detect the electrolytic tank 31's temperature so as to turn on or off the cooling device 60's cooling towards the electrolytic tank 31.

Preferably, an oxidation reduction potential (ORP) detector 45 is configured on the reaction tank 42 so as to monitor the reaction tank 42's oxidation and reduction status.

Preferably, a temperature sensor 64 is configured on the coolant tank 61 to detect the coolant tank 61's temperature so as to control the cooling device 60's cooling operation.

The present invention has the following advantages.

1. As the present invention innovatively connects and systematically controls the water storage device 10, electrolyte storage device 20, electrolytic device 30, reaction device 40, storage device 50, cooling device 60, and cleaning device 70, the present invention is able to achieve quick and mass production of chlorine dioxide solution.

2. As multiple reaction tanks 42 are employed and interconnected by pipes, the electrolytic device 30 may continuously produce by electrolysis chlorine dioxide gas which is mixed with water to form chlorine dioxide solution by the mixer 413, thereby achieving significantly higher production efficiency.

3. As multiple reaction tanks 42 are employed, the production of chlorine dioxide solution is not required to be interrupted for emptying the reaction tank 42 if only one reaction tank 42 is used, thereby achieving significantly higher production efficiency and yield.

4. As the electrolytic device 30 is further connected to the cooling device 60, the cooling device 60 is able to conduct heat exchange with the electrolytic device 30 so as to maintain the electrolytic device 30's operation temperature and to prevent the electrolysis reaction of the electrolytic device 30 from being compromised by overheating.

5. Due to the provision of the cleaning device 70, the electrolytic device 30 may be cleaned after each production of the chlorine dioxide solution so as to completely remove the alkaline waste liquid residual in the electrolytic device 30 and to prevent the residual waste liquid to interfere the subsequent electrolytic process.

6. As the amount of chlorine dioxide solution in the reaction tank 42 is detected the low-level detector 43 and the high-level detector 44, the pressure valve 428 on the second outlet pipe 424 of the reaction tank 42 may be opened or closed so that the chlorine dioxide solution in the reaction tank 42 is output into the storage device 50, and the solution tank 52 is ready to hold the chlorine dioxide solution produced from the next production, thereby enhancing the production efficiency of the chlorine dioxide solution.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A system for manufacturing chlorine dioxide solution, comprising a water storage device, an electrolyte storage device, an electrolytic device, a reaction device, a storage device, a cooling device, and a cleaning device, wherein the water storage device is for storing water and comprises a water tank, a water pump connected to the water tank, and a water pipe connecting the water pump with the reaction device; the water tank compromises a low-level detector detecting water level in the water tank and an inlet connecting to a water source; the inlet is configured with a pressure valve;

the electrolyte storage device is for storing electrolyte and comprises an electrolyte tank, an electrolyte pump connected to the electrolyte tank, and a electrolyte pipe connecting the electrolyte pump with the electrolytic device; the electrolyte tank comprises a low-level detector;

the electrolytic device conducts electrolysis operation and comprises an electrolytic tank connected to the electrolyte tank through the electrolyte pipe, a gas pipe connecting the electrolytic tank to the reaction device for supplying chlorine dioxide gas, a waste discharge pipe connecting the electrolytic tank for discharging cleaning water or salty water from the electrolytic tank, a cooler for cooling down the electrolytic tank, a coolant discharge pipe connecting the cooler to the waste discharge pipe, and a reflow pipe connecting the cooler to the cooling device for recycling coolant; the waste discharge pipe is configured with a pressure valve;

the reaction device comprises a pump and a plurality of reaction tanks; the pump has an inlet pipe and an outlet pipe; the outlet pipe is configured with a mixer whose inlet is connected to the gas pipe of the electrolytic device; each reaction tank has a first inlet pipe, a second inlet pipe, a first outlet pipe, and a second outlet pipe; the first inlet pipe is connected to the water pipe of the water tank; the second inlet pipe is connected to the outlet pipe of the pump; the first outlet pipe is connected to the inlet pipe of the pump; the first inlet pipe is configured with a pressure valve, and the second inlet pipe, first outlet pipe, and second outlet pipe are respectively configured with pressure valves, all capable of acid and alkali resistance; each reaction tank has a low-level detector and a high-level detector detecting the level of chlorine dioxide solution in the reaction tank;

the storage device comprises a solution tank for storing chlorine dioxide solution, a solution pump, a solution outlet pipe connecting the solution pump to the solution tank, a solution inlet pipe connecting the solution pump to the second outlet pipes of the reaction device, and a low-level detector and a high-level detector detecting chlorine dioxide solution level inside the solution tank; the solution outlet pipe is configured with a pressure valve capable of acid and alkali resistance;

the cooling device comprises a coolant tank for storing coolant, a coolant pump connecting the coolant tank, a coolant pipe connecting the coolant pump to the cooler of the electrolytic device; the coolant pipe is configured with a pressure valve;

the cleaning device comprises a clear water tank for storing clear water, a clear water pump connecting the clear water tank, a clear water pipe connecting the clear water pump to the electrolytic device, a low-level detector detecting whether the clear water in the clear water tank is too little, a clear water inlet pipe connecting the clear water tank to a clear water source; the clear water pipe is configured with a pressure valve; and the clear water inlet pipe is configured with a pressure valve.

2. The system for manufacturing chlorine dioxide solution according to claim 1, wherein a temperature sensor is configured on the electrolytic tank of the electrolytic device.

3. The system for manufacturing chlorine dioxide solution according to claim 1, wherein an oxidation reduction potential (ORP) detector is configured on the reaction tank of the reaction device.

4. The system for manufacturing chlorine dioxide solution according to claim 1, wherein a temperature sensor is configured on the coolant tank of the cooling device.

* * * * *